(12) United States Patent
McMahon

(10) Patent No.: US 11,526,795 B1
(45) Date of Patent: Dec. 13, 2022

(54) EXECUTING VARIATIONAL QUANTUM ALGORITHMS USING HYBRID PROCESSING ON DIFFERENT TYPES OF QUANTUM PROCESSING UNITS

(71) Applicant: QC Ware Corp., Palo Alto, CA (US)

(72) Inventor: Peter L. McMahon, Menlo Park, CA (US)

(73) Assignee: QC Ware Corp., Palo Alto, CA (US)

( * ) Notice: Subject to any disclaimer, the term of this patent is extended or adjusted under 35 U.S.C. 154(b) by 692 days.

(21) Appl. No.: 16/546,088

(22) Filed: Aug. 20, 2019

Related U.S. Application Data

(60) Provisional application No. 62/792,237, filed on Jan. 14, 2019.

(51) Int. Cl.
*G06N 10/00* (2022.01)
*G06N 20/00* (2019.01)
*G06N 3/08* (2006.01)

(52) U.S. Cl.
CPC ............... *G06N 10/00* (2019.01); *G06N 3/08* (2013.01); *G06N 20/00* (2019.01)

(58) Field of Classification Search
USPC .......................................................... 706/62
See application file for complete search history.

(56) References Cited

U.S. PATENT DOCUMENTS

| 8,421,053 | B2 | 4/2013 | Bunyk et al. |
| 9,183,508 | B2 | 11/2015 | King |
| 2014/0187427 | A1* | 7/2014 | Macready ............... G06N 5/02 706/46 |
| 2017/0223094 | A1 | 8/2017 | Johnson et al. |
| 2017/0228483 | A1* | 8/2017 | Rigetti .................. G06F 30/367 |

OTHER PUBLICATIONS

Brandao, F. et al., "For Fixed Control Parameters the Quantum Approximate Optimization Algorithm's Objective Function Value Concentrates for Typical Instances," arXiv, Dec. 2018, vol. 1812. 04170, pp. 1-16.
Zhou, L. et al., "Quantum Approximate Optimization Algorithm: Performance, Mechanism, and Implementation on Near-Term Devices," arXiv, Dec. 2018, vol. 1812.01041, pp. 1-19.

* cited by examiner

*Primary Examiner* — Bryce M Aisaka
(74) *Attorney, Agent, or Firm* — Fenwick & West LLP

(57) ABSTRACT

A variational quantum algorithm is solved using two types of quantum processing units (QPU) with different performance metrics (e.g., speed, size and fidelity). One type of quantum processing unit (QPU) is used to optimize some or all of the circuit parameters in a first stage, and these are then used with a different type QPU in a second stage to solve the target problem. The different performance metrics permit tradeoffs between the two stages.

20 Claims, 8 Drawing Sheets

EXECUTING VARIATIONAL QUANTUM ALGORITHMS USING HYBRID PROCESSING ON DIFFERENT TYPES OF QUANTUM PROCESSING UNITS

CROSS-REFERENCE TO RELATED APPLICATION(S)

This application claims priority under 35 U.S.C. § 119(e) to U.S. Provisional Patent Application Ser. No. 62/792,237, "Methods for Improving the Performance of Variational Quantum Algorithms Using Hybrid Processing on Different Types of Quantum Processing Units," filed Jan. 14, 2019. The subject matter of all of the foregoing is incorporated herein by reference in their entirety.

BACKGROUND

1. Technical Field

This disclosure relates generally to circuit-model quantum computation and, more specifically, to executing variational quantum algorithms.

2. Description of Related Art

The conventional approach to running a variational quantum algorithm is the following. A quantum computer is programmed to implement a circuit that encodes the problem to be solved. The circuit is run many times, both to optimize circuit parameters for the circuit and to obtain a solution to the problem of interest once the circuit parameters have been optimized. However, quantum computers that have the fidelity and size in qubits required to produce a final solution typically run slowly, and running the circuit a large number of times on such a quantum computer takes a long time.

Thus, there is a need for better approaches to executing variational quantum algorithms.

SUMMARY

The present disclosure overcomes the limitations of the prior art by executing a variational quantum algorithm using two different types of hardware quantum processing units (QPUs). A QPU is quantum hardware that may be programmed to implement different quantum circuits that can be used to solve different problems. Typically, the quantum circuits are parameterized and the parameters are optimized as part of the process for solving the problem of interest, which will be referred to as the target problem.

In one approach, one type of QPU is used to optimize some or all of the circuit parameters, and these are then used with a different type of QPU to solve the target problem. The two QPUs have different performance metrics. Examples of performance metrics include speed of operation, capacity (number of qubits) and fidelity. Between the two QPUs, one is better in some metrics and worse in others. A hybrid approach that uses both QPUs can take advantage of the relative strengths of each QPU for different stages of the problem solving.

For example, the first QPU may run faster than the second QPU, but with fewer qubits or lower fidelity. In a first stage, the first QPU is programmed to implement a first circuit that encodes a problem from a same family as the target problem to be solved. For convenience, this will be referred to as a precursory problem. The circuit parameters for the first circuit are initialized and the first circuit is run many times to iteratively optimize the circuit parameters for the first circuit. Because the first QPU runs faster, the circuit parameters are optimized in less time. In a second stage, the second QPU is then programmed to implement a second circuit that encodes the target problem. The circuit parameters for the second circuit are initialized based on the optimized circuit parameters for the first circuit. The second circuit is then run many times to obtain a solution to the target problem. The circuit parameters for the second circuit may (or may not) also be further optimized during these runs.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
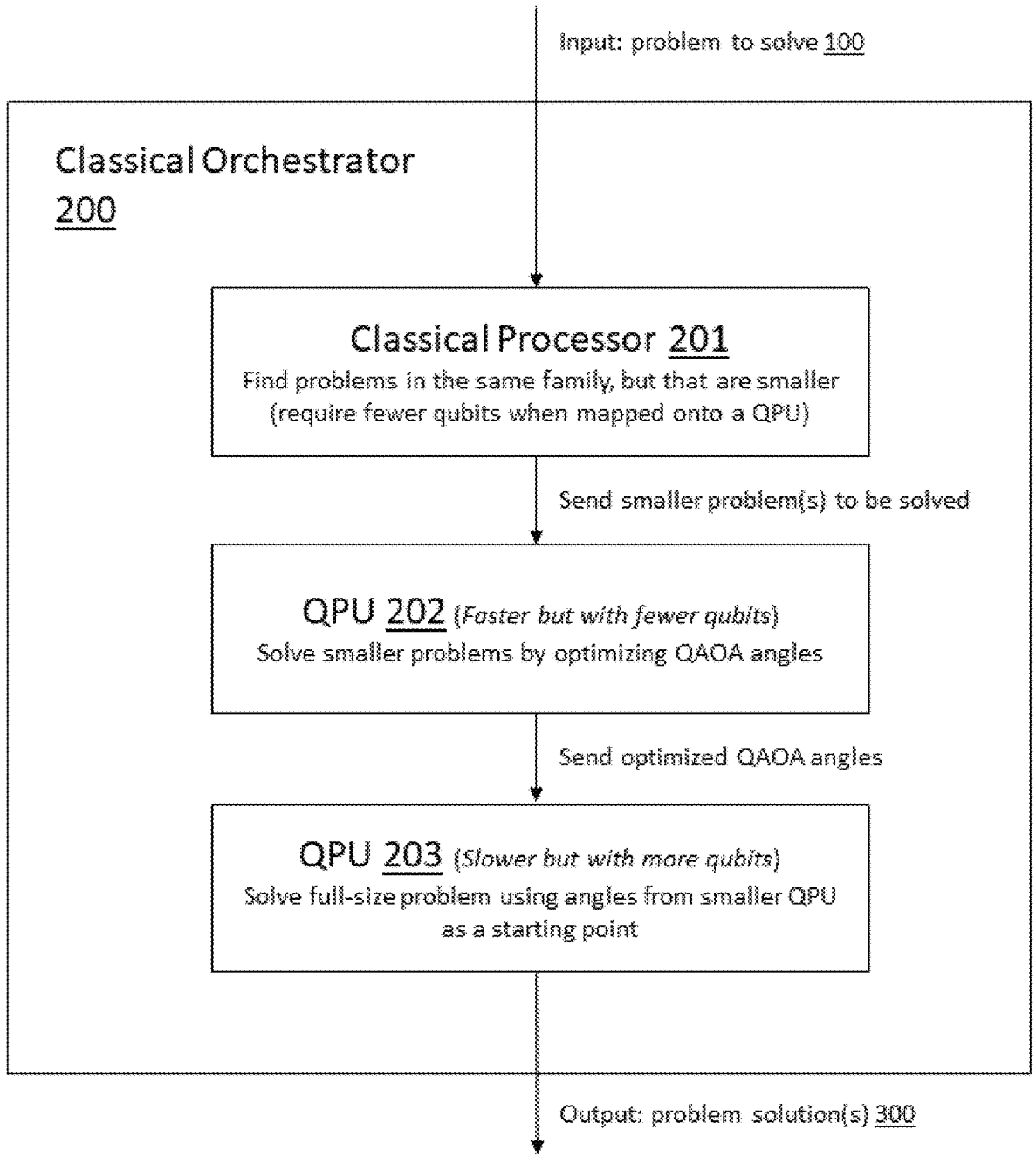
FIG. 1 is a diagram for executing a quantum approximate optimization algorithm using two different types of hardware QPUs.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

This disclosure provides approaches for exploiting two or more different types of QPUs to execute a variational quantum algorithm in a way that yields a faster overall time to solution and/or higher quality results (e.g., solution accuracy) than if just one type of QPU were used. Examples of variational quantum algorithms include but are not limited to the quantum approximate optimization algorithm (QAOA), the variational quantum eigensolver (VQE) algorithm, and quantum neural network (QNN) algorithms.

There are many different hardware platforms that quantum processing units (QPUs) are being realized in. These hardware QPUs can differ greatly in their fundamental speed of operations (initialization, 1-qubit-gate, 2-qubit-gate, measurement) and the total time to execute a given circuit (which depends not only the operations speeds but also on the connectivity of the qubits in the QPU). They can also differ in the fidelity of the various operations. There are also differences in the number of available qubits. Some types of QPUs are easier to scale to larger sizes than others.

Different types of QPUs include trapped-ion QPUs, superconducting circuit QPUs, neutral-atom QPUs, donor-electron-spins-in-semiconductors QPUs, silicon-quantum-dot QPUs, Majorana-fermion (aka topological) QPUs, photonic QPUs, and liquid-state nuclear-magnetic-resonance QPUs. No hardware platform has an optimum value in every metric. For example, a trapped-ion QPU may have two-qubit-gate times of ~250 microseconds, whereas superconducting circuit QPUs may have two-qubit-gate times of ~250 nanoseconds. That is a 1000× difference in speed, but the fidelity of the two-qubit gates may be higher on the trapped-ion QPUs than on the superconducting circuit QPUs. As additional examples, neutral-atom QPUs when implemented with Rydberg states currently have two-qubit-gate times of ~100 ns, donor-electron-spins-in-semiconductors QPUs currently have two-qubit-gate times of ~1 ns, and silicon-quantum-dot QPUs currently have two-qubit-gate times of ~1 microsecond. These are all faster than trapped-ion QPUs, but these QPUs currently also have worse fidelity than trapped-ion QPUs.

Different types of QPUs also have different capacity limitations. Although this is changing rapidly, current approximate size limitations are the following: superconducting: ~20-50 qubits; trapped ions: ~20 qubits; neutral atoms: ~50 qubits; donor spins: 2 qubits; quantum dots: 2 qubits; photons: ~4-10 qubits; NMR: ~10 qubits. The foregoing performance metrics are representative numbers that roughly characterize some of the QPUs that have been reported to date. They will improve over time and, even today, different implementations of the same type of QPU may have difference performance metrics.

Rather than executing a variational quantum algorithm on a single type of QPU, one may adopt an approach from a set of hybrid strategies that involves using two or more different types of QPUs, taking advantage of the different performance characteristics of different types of QPUs for different stages of the computation. One approach uses the fact that part or all of the optimization of the circuit parameters may be performed on one type of QPU and then those optimized circuit parameters may be used when running related circuits on a different type of QPU in a later stage.

The choices of QPU will depend on which variational quantum algorithm one is working with. The following examples are for QAOA and QNNs, but the principles shown can be used with other types of variational quantum algorithms.

In QAOA, the goal is to find the solution (or an approximate solution) to a given combinatorial-optimization problem. The conventional mode of operation is that given a target problem to solve, QAOA is executed without any problem-specific assumptions about the circuit's parameterized angles and proceeds to search the space of angles to minimize the average objective-function value. In the standard formulation of QAOA, the number of angles is independent of the problem size N, and depends only on the number of levels in the circuit p. For a p-level circuit, there are 2p angles to be optimized.

The following principles may be used to speed up the overall time to solution. 1) If the angles are optimized to obtain good results for a particular problem (the precursory problem), then if the QAOA circuit with those optimized angles is run on a different problem that is from the same family (the target problem), the QAOA circuit will also output a high-quality result for this other problem. 2) If the angles are optimized to obtain good results for a problem of size N (the precursory problem), then if one runs the QAOA circuit with those optimized angles on a different problem that is from the same family but has a much larger size (the target problem), the QAOA circuit will still output a high-quality result for this other problem.

The problems in a family are related. As a result, the solution for one problem in the family (determined by one type of QPU) is useful in arriving at the solution for another problem in the family (determined by a different type QPU). In one approach, if the problems to be solved are considered as graphs, where variables are graph vertices and terms in the objective function give edges between these vertices, then a problem family can be thought of as the problems corresponding to the graphs from a graph family. A graph family is a collection of graphs that are related by some property (e.g., density) or other structural or combinatorial information (e.g., k-regularity). There are many known graph families.

As an example, assume that the target problem has a cubic graph structure (i.e., every vertex on the graph has exactly three edges). In one approach, the precursory problem may be a smaller cubic graph (i.e., a cubic graph with a smaller number of vertices than that of the target problem), then the optimal parameters to solve that smaller-cubic-graph problem may be similar to the optimal parameters required to solve the larger-cubic-graph problem. In a different approach, the precursory problem may be a subgraph of the big graph. That subgraph will not necessarily be a cubic graph itself. Another example is if we take the graph for the target problem and find the clusters in it, we could form a smaller graph (the precursory problem) where the vertices represent the clusters in the big graph and the edges represent the connections between the clusters. Similar approaches may be used with other graph families.

In yet another approach, the family is based on the density of the graph, defined as the fraction of number of edges to possible number of edges a graph actually has. For example, if the target problem had a graph density of 75%, then the precursory problem may have a graph that also has an edge density of approximately 75%.

In the case of QAOA, the examples below exploit these principles.

Faster, fewer-qubit QPU and slower, more-qubit QPU. FIG. 1 is a diagram for executing a quantum approximate optimization algorithm using a computer system with two different types of hardware QPUs. The computer system includes a classical processor 201 (i.e., conventional computer) and two QPUs 202 and 203 of different types. It also includes a conventional computer (referred to as the classical orchestrator 200) that coordinates the three processors 201, 202, 203. QPU 202 has fewer qubits but faster circuit-execution time, whereas QPU 203 has more qubits but slower circuit-execution time. The faster QPU 202 is used to find QAOA angle estimates based on smaller-size problems from the same problem family as the target problem of interest, and QPU 203 is used to solve the target problem by starting from the optimized angles computed by QPU 202.

The angles for the QAOA circuit will first be chosen, using the standard QAOA hybrid quantum-classical approach, by running QAOA on a QPU 202 that has the faster time to execute a single QAOA circuit. Given the combinatorial-optimization problem of interest 100 (the target problem), a classical processor 201 generates a problem that is from the same family as the target problem but has smaller size such that it fits on QPU 202. For convenience, this will be referred to as a precursory problem. The classical orchestrator 200 programs QPU 202 to implement a circuit that encodes the precursory problem and initializes the circuit parameters (e.g., angles) for this circuit. The angles are optimized by executing the standard QAOA approach, which runs the circuit multiple times on QPU 202.

Now that the optimal angles have been found, the target problem is run on the slower QPU 203 that has more qubits, using the optimized angles that have been found already, to generate the problem solution 300 to the full-size problem. The classical orchestrator 200 programs QPU 203 to implement a circuit that encodes the full-size target problem and initializes the circuit parameters (e.g., angles) for this circuit based on the optimized angles from QPU 202. The variational quantum algorithm (QAOA in this example) is executed by running this circuit many times on QPU 202, which finds the solution 300 for the full-size target problem.

A separate computer (the classical orchestrator 200) may be used to manage this entire process. It acts as the classical interface to the user to accept the input problem 100 and returns the solution 300, and manages the flow of information between the internal processors 201, 202 and 203.

The speedup obtained from using this workflow is approximately equal to the speed of the gates in the first QPU 202/the speed of the gates in the later QPU 203. If QPU 202 were a superconducting qubit system with two-qubit-gate times of 250 ns and QPU 203 were a trapped-ion system with two-qubit-gate times of 250 us, then the speedup would be approximately 1000×.

A variant of this flow is that the slower QPU 203, instead of just executing the QAOA circuit with the angles found with the faster QPU 202, can use those angles as an initial choice and then execute iterations of optimization to further refine the initial choice of angles. In this way, the first QPU 202 is used to quickly find a good approximation to the optimal angles, and the full-size QPU 203 is used to find the optimal set of angles to be used for execution.

Figure 2:
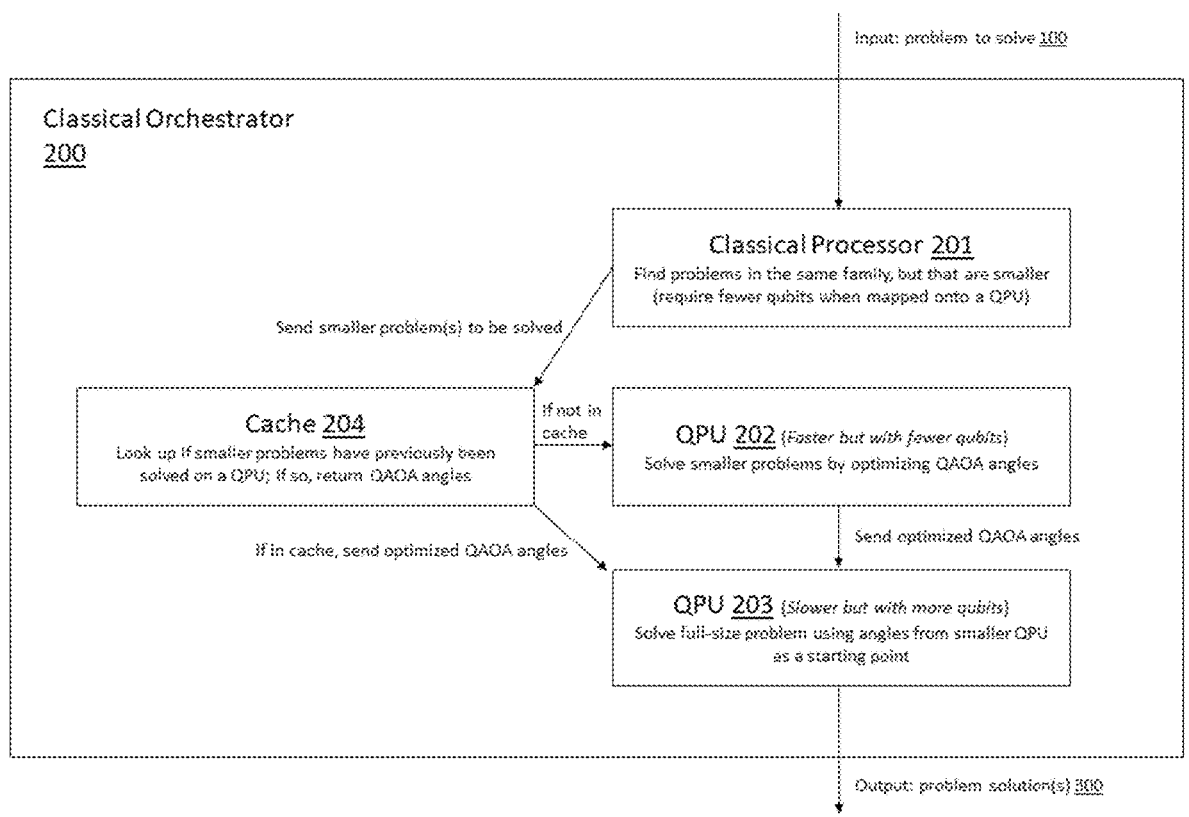
FIG. 2 is a diagram for executing a quantum approximate optimization algorithm using two different types of hardware QPUs and caching.

Another variant is based on caching. See FIG. 2. A database 204 of representative problems from different families is generated. For example, the QPU 202 may be used to calculate the optimal angles for each of the representative problems, with the results stored in a database. Then, when a new target problem is to be solved, the classical computer 201 first performs a database lookup to find the optimal angles for the family to which the target problem belongs. If present, the stage using the faster QPU 202 is skipped and the target problem is solved on QPU 203 using the angles from the database. If not present, the QPU 202 generates the optimal angles as before, with the result added to the database.

The above-mentioned strategies may be extended to the case when there are not just two types of QPU, but three or more. For example, in the case when there is a fastest QPU that has the smallest number of qubits, a medium-speed QPU with a medium number of qubits, and a slowest QPU with the largest number of qubits, processing may begin with the fastest QPU as described above, then initialize the angles on the medium-speed QPU to help with optimizing a set of problems that have larger size, and then finally use the slowest QPU with angles initialized based on the results from the medium-sized QPU.

Figure 3:
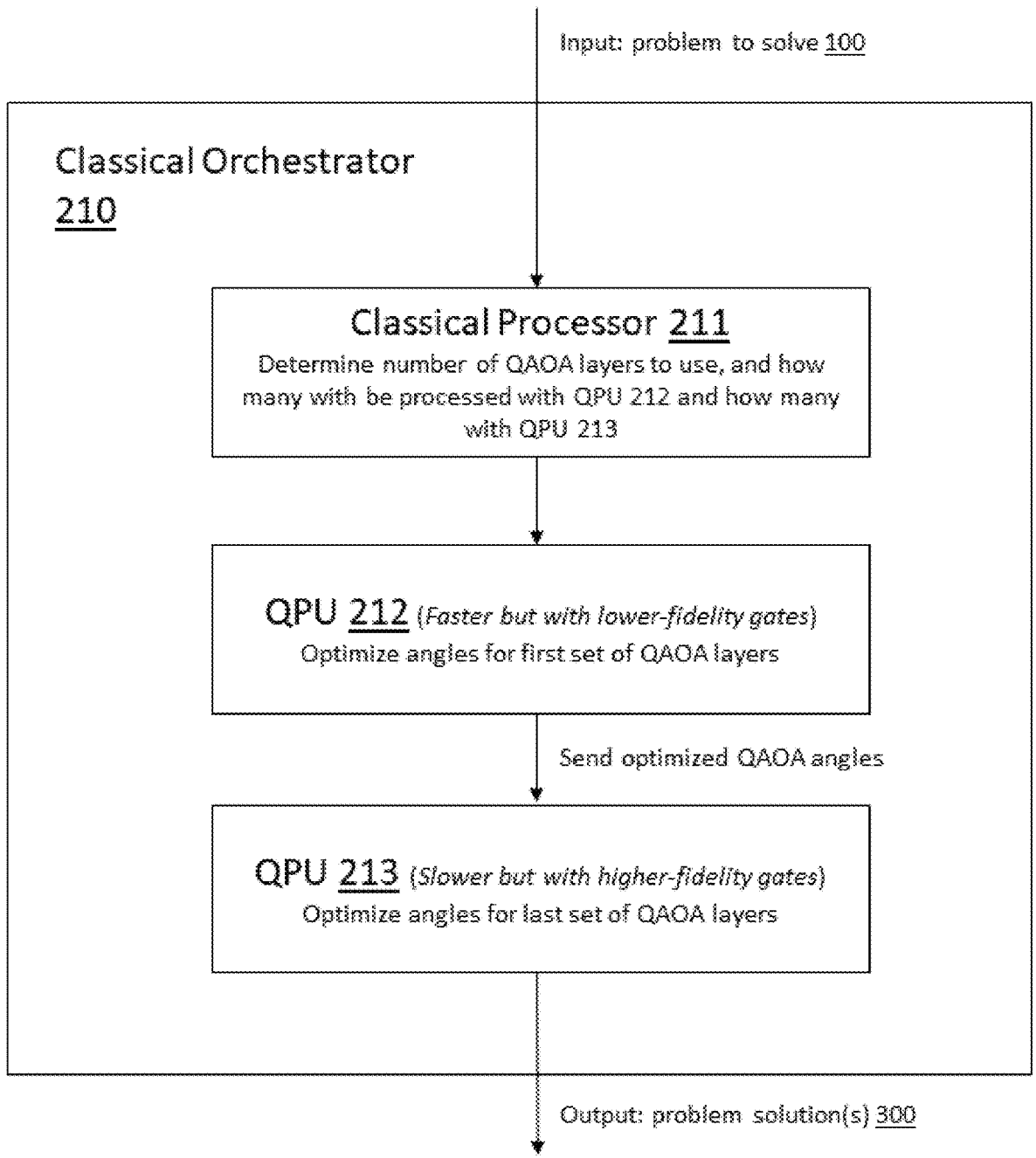
FIG. 3 is another diagram for executing a quantum approximate optimization algorithm using two different types of hardware QPUs.

Faster, lower-fidelity QPU and slower, higher-fidelity QPU. FIG. 3 is another diagram for executing a quantum approximate optimization algorithm using two different types of hardware QPUs, where the QPUs are used to perform optimization of QAOA angles only up to the layer depth that their fidelity can support. In this example, QPU 212 has lower-fidelity gate operations but faster circuit-execution time, and QPU 213 has higher-fidelity gate operations but slower circuit-execution time.

One consequence of lower gate fidelities is that shorter circuits can be meaningfully executed, and hence in the case of QAOA, a smaller number of levels p can be used. The higher p one can use, the better QAOA performs, so typically one would like to run QAOA on a QPU 213 that has the higher-fidelity gates. If the QPU 213 with the higher-fidelity gates is slow, then one encounters a tradeoff. One can go to higher p, but the time to find the optimal angles may be prohibitively long. Given that the primary goal of QAOA is to deliver a speedup in solving optimization problems over classical solutions, having the QPU take a long time would negate the purpose of using the QPU. Alternatively, one could run QAOA on a faster QPU with a circuit with lower p, but this will give lower-quality results.

In FIG. 3, the faster QPU 212 is used to optimize as many angles as possible, and then the slower QPU 213 is used to optimize angles beyond those from the faster QPU. In one aspect, an interpolation strategy is used for optimizing QAOA angles. An example of an interpolation strategy is described in L. Zhou, S.-T. Wang, S. Choi, H. Pichler, M.D. Lukin. "Quantum Approximate Optimization Algorithm: Performance, Mechanism, and Implementation on Near-Term Devices." arXiv:1812.01041 (2018), which is incorporated herein by reference.

More generally, there are many possible strategies for choosing optimal angles that involve first optimizing angles from the first 1 layers, and then optimizing angles for all p layers. One such strategy is layer-by-layer training, where the angles for the first layer are optimized and then these angles are used to estimate what the angles of the second layer should be. From that initial estimate, the angles for the second layer are then optimized. The angles for the second layer are then used to make an initial guess for the choice of angles for the third layer, and so on. Suppose that the maximum number of QAOA levels/that the faster QPU 212 can meaningfully execute is 10. We optimize the QAOA angles for each level up to 10, using the faster QPU 212. Then we use the slower QPU 213 to run circuits with a higher number of levels, e.g., up to p=15. The speedup that can be achieved by applying this strategy is limited by Amdahl's Law, and in this case would be a maximum of 3× (derived as $1/(1-(10/15))$).

There are natural extensions of this strategy from the case where there are just two QPUs to cases where there are more than two types of QPU (e.g., three types: a fastest, lowest-fidelity QPU; a medium-speed, medium-fidelity QPU; and a slowest, highest-fidelity QPU).

Figure 4:
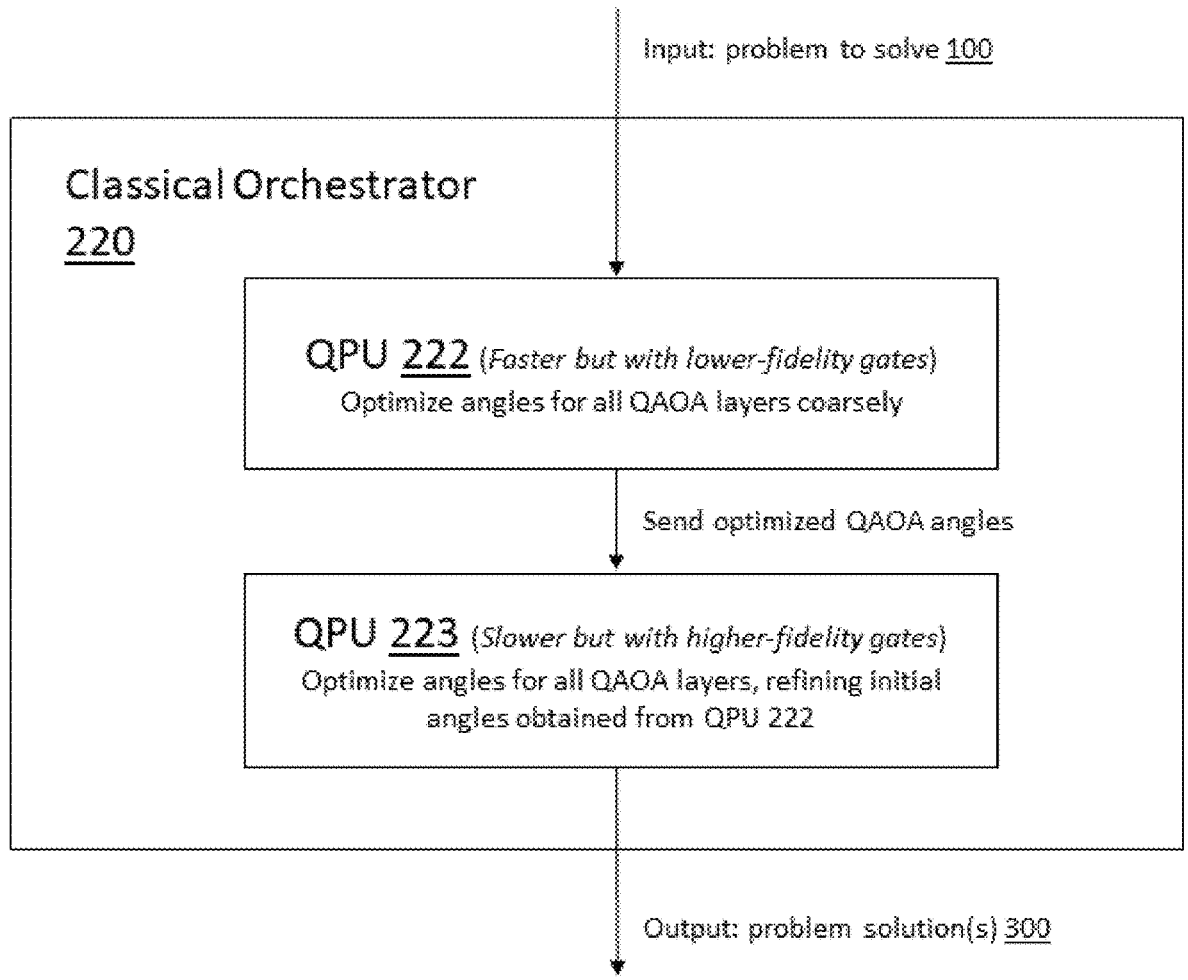
FIG. 4 is yet another diagram for executing a quantum approximate optimization algorithm using two different types of hardware QPUs.

FIG. 4 is yet another diagram for executing a quantum approximate optimization algorithm using two different types of hardware QPUs, in which a first QPU 222 produces coarse estimates of the optimal QAOA angles and a second QPU 223 refines those angles. The faster QPU 222 is used to perform an optimization for all p QAOA levels (using any optimization method—it could be a layer-by-layer approach, or it could be one of the black-box approaches like gradient descent, or any other optimization method). The fact that the faster QPU 222 has lower fidelity may result in the QAOA parameters not being optimized completely correctly. Then, using as a starting point the parameters found via optimization with the faster QPU, the QAOA parameters are refined by optimization with the slower QPU 223. By using this strategy, one may potentially achieve a speedup on the order of the difference in speeds between the faster QPU and the slower QPU, e.g., 1000× if the faster QPU has twoqubit-gate times of ~250 ns and the slower QPU has two-qubit-gate times of ~250 us, as can be the case with superconducting circuit vs trapped-ion systems.

Again, there are natural extensions to cases where there are more than two types of QPU (e.g., three types: a fastest, lowest-fidelity QPU; a medium-speed, medium-fidelity QPU; and a slowest, highest-fidelity QPU). We use the fastest QPU first, to get a first estimate of the optimal parameters, then use the second-fastest QPU to refine the parameters, then using the third-fastest QPU to perform further refinement, and so on.

The strategies described above using the example of QAOA, may also be applied in certain cases to the VQE family of algorithms for finding eigenstates of quantum systems. VQE algorithms also involve optimizing angles/parameters with respect to the average output of a quantum circuit (although in the case of VQE, more measurements are usually needed because typically one needs to measure in many different bases, not just the computational basis, as is the case with QAOA). The notions of layer-by-layer optimization, and acceleration via initializing angles based on computations on smaller versions of problems (i.e., molecules or quantum systems in general), or problems from similar classes (e.g., structurally similar molecules) may be beneficial in many different VQE applications.

As a final example, consider QNN algorithms. Note that QNNs also go by the name "quantum circuit learning", and include, but are not limited to, random circuits, neural-network-inspired circuits, and tensor networks (including MPS, PEPS, and MERA). In this patent application we use the generic term QNN to refer to any of these.

QNNs differ from QAOA and VQE in that with QAOA and VQE the goal is merely to find some optimal choice of parameters such that an optimization problem is solved (e.g., typically a classical combinatorial-optimization problem in the case of QAOA, or a quantum-system eigenstate-finding problem in the case of VQE). Once the solution has been found, there is no need to run the algorithm again. However, QNNs are a machine-learning approach (generalizing classical neural networks) and have two main phases: training and inference. In the training phase one attempts to optimize the parameters of the QNN to have the QNN either learn an output distribution (in the case of generative modelling) or learn how to classify different inputs (in the case of discriminative modelling). In the inference phase the parameters are fixed, and one either generates new samples from the learning distribution (in the case of generative modelling) or classifies whatever input is provided to the circuit (in the case of discriminative modelling).

Regarding the training phase for QNNs, the hybrid strategies described above for QAOA may also be used for training QNNs. For example, see QPUs 502 and 503 in FIG. 5.

However, in addition to this, we make a further extension. QNNs are envisaged to be often used where the training is performed once, offline, but where inferences are performed many times and need to be fast (e.g., speech-to-text conversion, or natural language transition, such as English-to-German). In analogy to how in classical deep learning it is important to have high-precision representations of the neural-network weights during training, but the weights' precision can be reduced when performing inference, we use a hybrid strategy for QNNs wherein a different mix of QPUs may be used for training and for inference. For example, a simple version of this strategy may be to use a slower QPU with higher fidelity when training, and then use a faster QPU with lower fidelity when performing inference. A variant of this would be to use one of the hybrid strategies for training the QNN (as discussed for QAOA), and then for the inference stage to use a single type of QPU (e.g., faster with lower fidelity).

Figure 5:
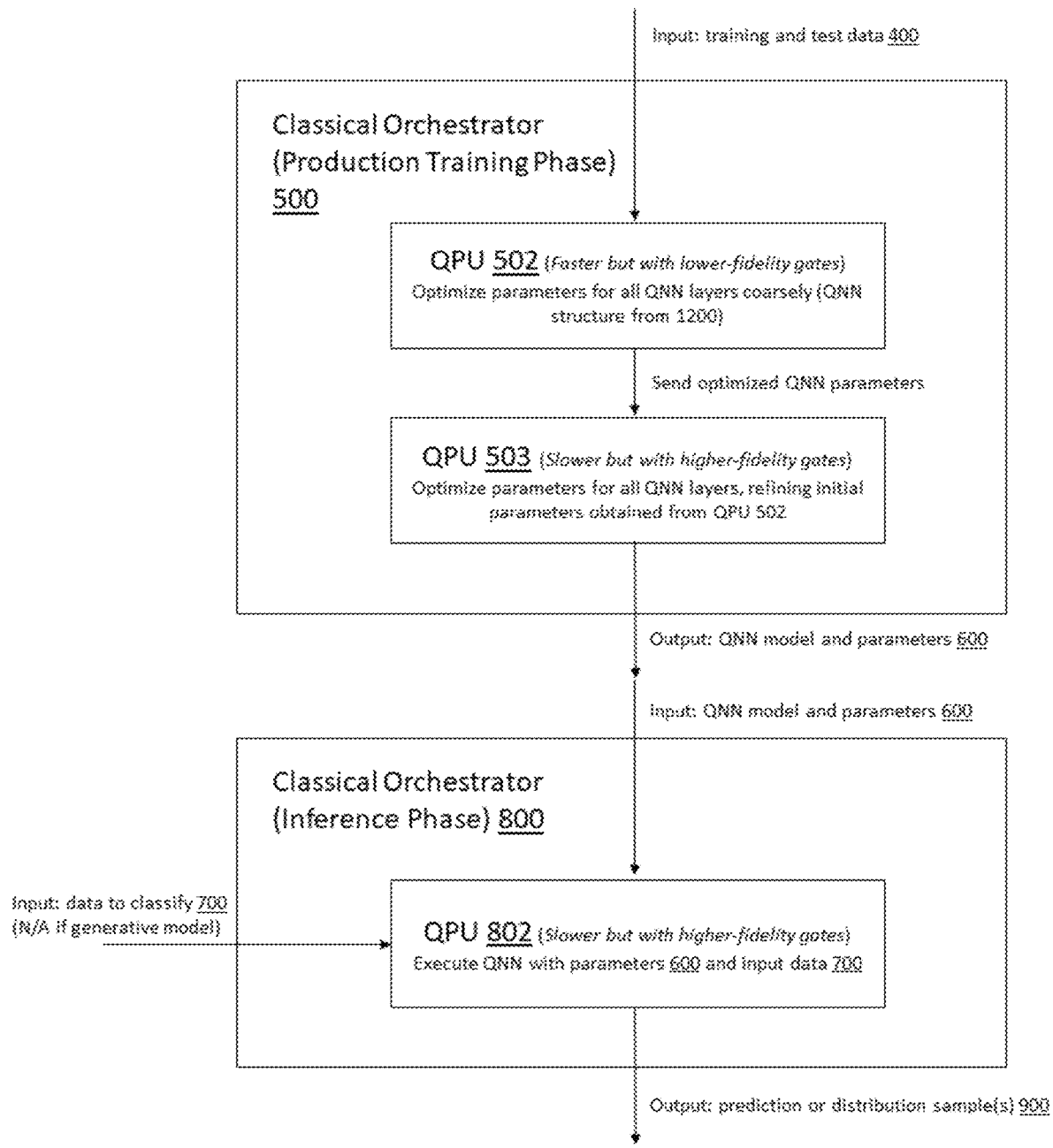
FIG. 5 is a diagram for executing a quantum neural network algorithm using two different types of hardware QPUs.

In some cases, it may be beneficial to do the opposite. Since the training requires a great many evaluations of the circuit, one may want to use the faster QPU with lower fidelity to perform the training stage and then use the slower QPU 802 with higher fidelity for inferences, as shown in FIG. 5. This is entirely plausible because a "slower" QPU may still be able to execute a QNN circuit in a short time (e.g., <10 ms), depending on the depth of the QNN circuit, which may be sufficiently fast for any practical use of inference.

Exactly which hybrid strategy is selected may depend on the details of the particular QNN and the application, and benchmarking may be used to discover which combination of use of faster-but-lower-fidelity QPU vs slower-but-higher-fidelity QPU gives the best overall performance (in terms of any metrics one may be interested in, e.g., total training time; accuracy; single-inference speed).

Yet another additional hybrid strategy for QNNs concerns a third phase: model development. Before a QNN is trained, a machine-learning engineer chooses an architecture for the network/circuit. It is typically not obvious a priori what architecture will be best for a particular application and dataset, so substantial experimentation is usually involved in developing the model. A model is selected, then trained on at least some subset of the available training data. It is tested, and then refined based on the test performance. There may be many iterations of tweaking the model and training it before the model is finalized and one progresses to the phase of training the model on all the available training data to ready the system for production inference. During the model-development phase, it may be advantageous to use a different type of QPU (or a different strategy) than during the training phase. For example, in order to facilitate faster development of the model via faster feedback, one may wish to use a faster-but-lower-fidelity QPU during model development, and then transition to one of the hybrid strategies during the training phase (or the use of just the slower-but-higher-fidelity QPU).

Figure 6:
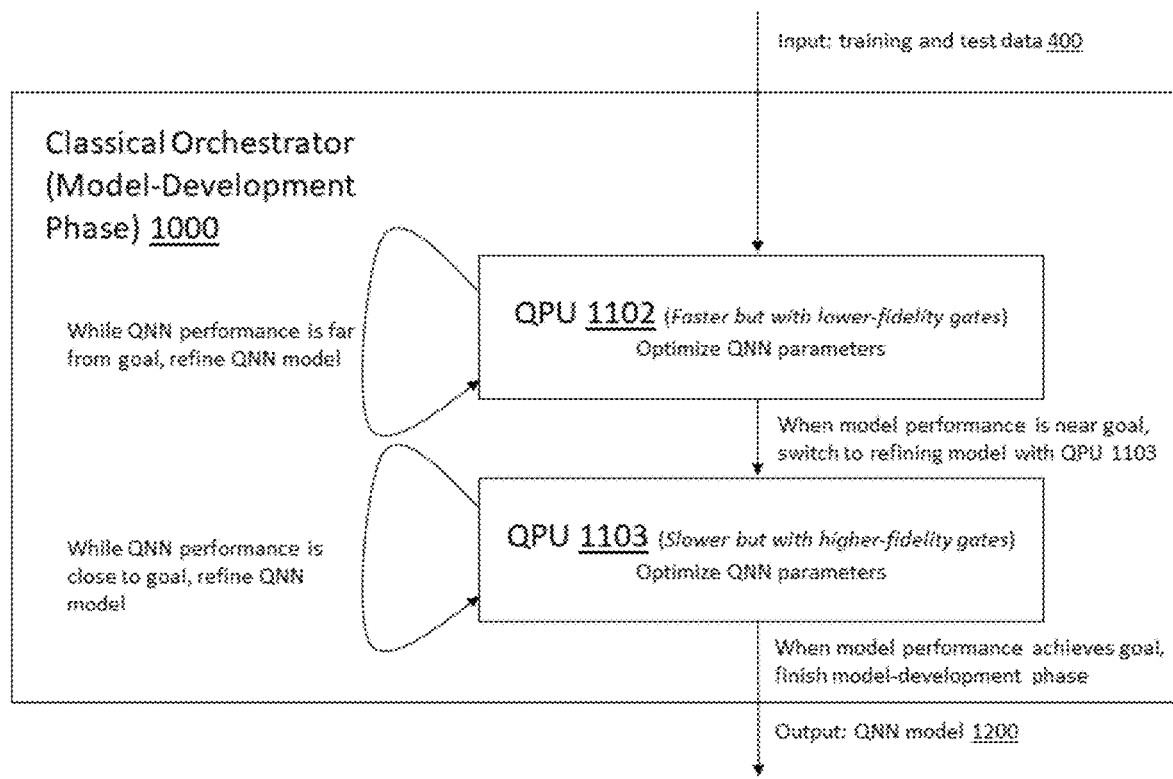
FIGS. 6 and 7 are diagrams of the model-development phase of QNNs using different types of QPUs.
Figure 7:
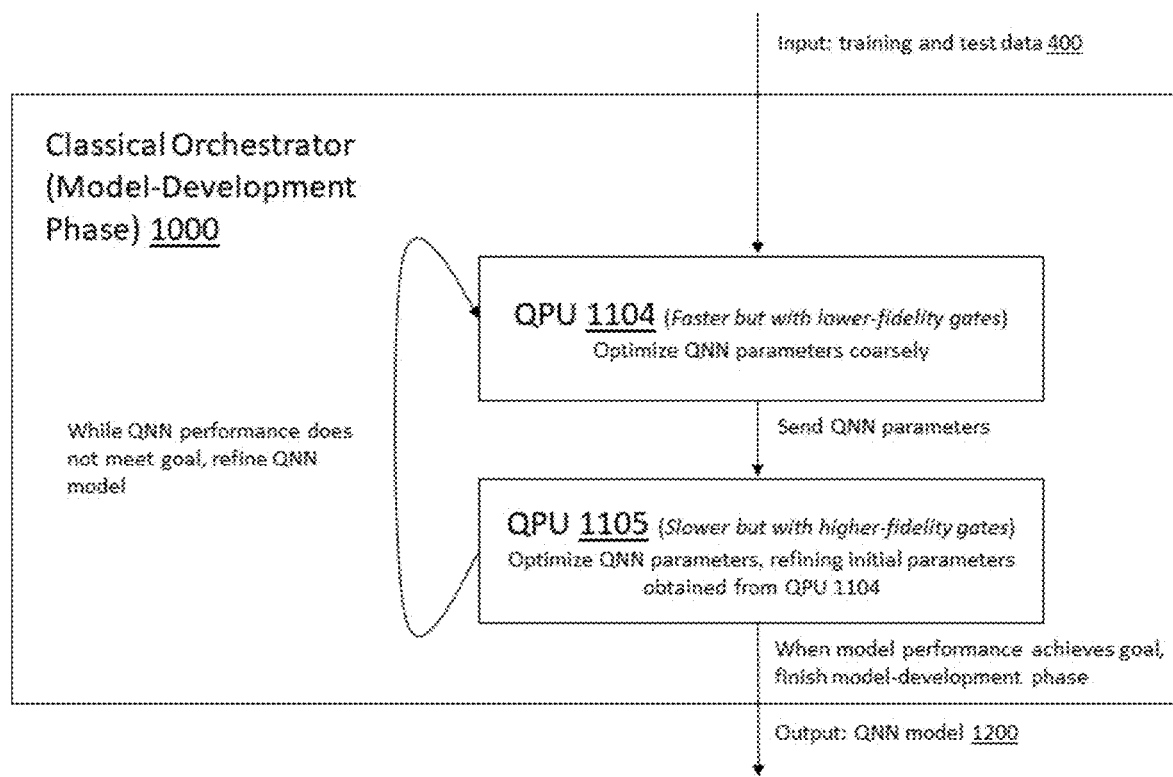

During model development it may also be advantageous to adopt a hybrid, adaptive use of different types of QPUs, for example, initially start with a faster-but-lower-fidelity QPU 1102, and then as the model is refined, switch (gradually or abruptly) to using the slower-but-higher-fidelity QPU 1103. See FIG. 6. One may switch back to pure use of a faster-but-lower-fidelity QPU 1102 if the refined model does not meet performance goals, and in this way one may go through many cycles of model development where different types of QPUs may be used at different times during each cycle. An alternative hybrid approach during the model-development phase, shown in FIG. 7, is that each proposed model is trained with a sequence of QPU 1104 and QPU 1105; the model is only updated after the training with both QPUs has been completed. This is in contrast to the approach illustrated in FIG. 6, in which the model is updated with the exclusive use of QPU 1102 for training first, and then is refined with the exclusive use of QPU 1103 for training.

Figure 8:
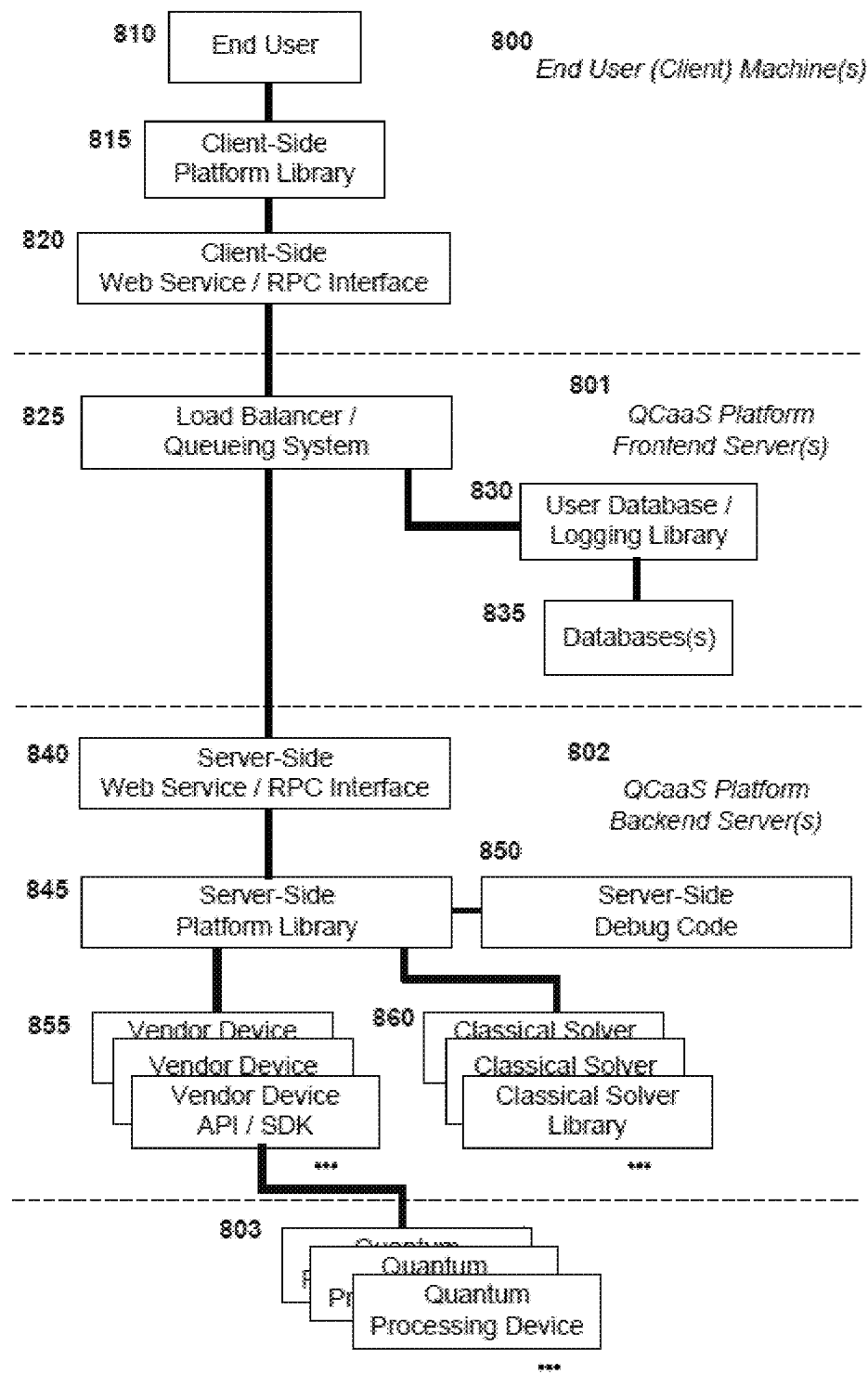
FIG. 8 is a logical diagram of one example of a platform component of a QCaaS architecture and system, including certain related infrastructure components, described in accordance with one or more embodiments of the invention.

The approaches described above extend beyond the examples given. More generally, different types of QPUs may be used beneficially in combination to achieve better performance (time-to-solution or solution accuracy) when applied to variational quantum algorithms. The use of different types of QPUs may be implemented through systems such as those described below in FIG. 8. FIG. 8 illustrates one implementation of quantum annealing computers that can be used to solve the financial portfolio optimization problem. In this example, the quantum processing devices 803 are examples of QPUs.

FIG. 8 is a logical diagram of one example of a platform component of a QCaaS (quantum computing as a service) architecture and system, including certain related infrastructure components, suitable for implementing the approaches described above. In the diagram, dashed lines indicate boundaries where information passes between different machines and/or logical realms. In the diagram, an end user 810 working on a machine 800 interfaces with a client-side platform library 815. This interaction may be, for example, the user inputting a problem in software code and calling a function in the client-side platform library 815 to pass that problem into the QCaaS system. The client-side platform library 815 then may communicate with a client-side web service or remote procedure call (RPC) interface 820 in order to transmit information about the problem to the remote QCaaS platform, for example in the form of user service requests.

The client-side platform library 815 may have any number of features to expose functionality for and ease the programming burden of the user. Examples include a collection of general-purpose software routines, data structures, API endpoints, etc. Additionally, the client-side library 815 may include any number of domain-specific libraries: collections of software routines, data structures, API endpoints, etc. that are designed specifically to aid with performing computations for specific domains. Examples include graph analytics, finance, machine learning, or any other domains. The additional libraries need not be domain specific libraries but may be any such additional libraries or modules that add value and functionality to the client-side platform library. Preferably, the client-side platform library 815 is designed in such a way as to be extensible by any other such possible modules.

Once the information reaches the remote QCaaS frontend servers 801, the next step is to organize the user requests, for example by routing the information through a load balancer and/or queuing system 825. For instance, if many users are simultaneously using the QCaaS platform, and there are only limited computational resources available through the platform, some of the system preferable will schedule and order the processing of various users' submitted tasks in a reasonable manner. Any number of standard load balancing and queuing algorithms and policies may be used. For instance, one may use a standard round robin algorithm for load balancing.

When this information is passed to the QCaaS frontend servers 801, many potential tasks may be performed. For example, a frontend server 801 may authenticate the user 810 using a database 835 and library 830. The frontend server 801 may also log the information supplied by the user via a logging library 830 and store that information in a database 835. For instance, the frontend server might record copies of the problems that users submit to the platform.

When the load balancer/queuing system 825 deems that a problem is ready to run on the QCaaS system, the information is passed to one or more backend servers 802 in a format governed by a server-side web service/RPC interface 840. The backend servers 802 generally process the user problems to a form suitable for use with quantum processing devices.

Passing through the backend interface 840, the problem information arrives at the server-side platform library 845 (explained in more detail in FIG. 9). The platform library 845 may interact with debugging libraries 850 or other similar libraries (e.g. logging libraries). The platform library 845 contains a variety of algorithms for taking a computational problem, preparing it for solution on quantum processing devices, executing the computational problem on such devices, and collecting and returning the results. The platform library 845 is not necessarily limited to interacting with just quantum processing devices. One or more classical solver libraries 860 for conventional processing devices may also be used by the platform library 845 for various purposes (e.g. to solve some part of a problem that is not well-suited to a quantum processing solution, or to compare an answer obtained on a quantum processing device to an answer obtainable via a classical solver library).

Generally, though not necessarily, the server-side platform library 845 processes a computational problem and any relevant information about it and passes that processed form onto one or more quantum computing interfaces, such as quantum processing device vendor APIs and/or SDKs 855. For example, if the end user 810 is solving a quadratic binary optimization problem, this problem may be converted by 845 into a form amenable for a D-Wave quantum processing device, whereupon the server-side platform library 845 passes the processed form of the problem to the low-level D-Wave API 855. Low-level APIs like these directly interact with the underling quantum processing devices 803. The quantum processing devices return one or more solutions, and possibly other related information, which are propagated back up the chain, to 855 and then to 845. Solutions and information, e.g. from 850, 855, and 860, are passed to and coalesced by 845. The resulting coalesced data returns to the user, for example via a reverse path through the server-side interface 840, load balancer 825, client-side interface 820, and client-side platform library 815, to finally arrive back at the end user 810.

The quantum processing devices 803 may be one or more physical devices that perform processing especially based upon quantum effects, one or more devices that act in such a way, one or more physical or virtual simulators that emulate such effects, or any other devices or simulators that may reasonably be interpreted as exhibiting quantum processing behavior.

Examples of quantum processing devices include, but are not limited to, the devices produced by D-Wave Systems Inc., such as the quantum processing devices (and devices built upon the architectures and methods) described in U.S. patent application Ser. No. 14/453,883, "Systems and Devices for Quantum Processor Architectures" and U.S. patent application Ser. No. 12/934,254, "Oubit [sic] Based Systems, Devices, and Methods for Analog Processing," both of which are hereby incorporated by reference in their entirety. Other quantum processing devices are under development by various companies, such as Google and IBM.

Quantum processing devices operate on qubits. The ability of qubits to exist in superpositions of 0 and 1 and for collections of qubits to be entangled, allows for greatly enhanced performance for certain computational tasks. For example, Shor's algorithm describes how a quantum processing device can be used to efficiently factor large integers, which has significant applications and implications for cryptography. Grover's search algorithm describes how a quantum processing device can be used to efficiently search a large set of information, such as a list or database. For further examples, see e.g. Shor, 1997, SIAM J. of Comput. 26, 1484; Grover, 1996, Proc. 28th STOC, 212 (ACM Press, New York); and Kitaev, LANL preprint quant-ph/9511026, each of which is hereby incorporated by reference in their entireties.

Although the detailed description contains many specifics, these should not be construed as limiting the scope of the invention but merely as illustrating different examples. It should be appreciated that the scope of the disclosure includes other embodiments not discussed in detail above. For example, QPUs with different combinations of performance metrics may be used, not just the specific examples described above. In addition, three or more types of QPUs may also be used. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for solving a target problem by executing a variational quantum algorithm using two different types of hardware quantum processing units (QPUs), the method comprising:
    programming a first QPU to implement a first circuit that encodes a precursory problem that is from a same family as the target problem;
    initializing circuit parameters for the first circuit; and
    repeatedly running the first circuit on the first QPU to iteratively optimize the circuit parameters for the first circuit;
    programming a second QPU to implement a second circuit that encodes the target problem; wherein the first and second QPUs are different types of QPU that are characterized by different performance metrics, and the first QPU is better than the second QPU in a first performance metric and worse than the second QPU in a second performance metric;
    initializing circuit parameters for the second circuit based on the optimized circuit parameters for the first circuit; and
    repeatedly running the second circuit on the second QPU to obtain a stochastic solution to the target problem.

2. The method of claim 1 wherein running the second circuit on the second QPU also further optimizes the circuit parameters for the second circuit.

3. The method of claim 1 wherein the first and second performance metrics are selected from a group consisting of speed, size and fidelity.

4. The method of claim 3 wherein the first QPU executes at a faster speed than the second QPU.

5. The method of claim 3 wherein the second circuit on the second QPU uses more qubits than the first circuit on the first QPU.

6. The method of claim 3 wherein the second QPU has higher fidelity than the first QPU.

7. The method of claim 1 wherein the second QPU is a trapped-ion QPU.

8. The method of claim 1 wherein the variational quantum algorithm is a quantum approximate optimization algorithm.

9. The method of claim 1 wherein:
    the circuit parameters for the first circuit comprise angles;
    the circuit parameters for the second circuit comprise angles;
    the second circuit on the second QPU uses more qubits than the first circuit on the first QPU; and
    the circuit parameters for the first circuit and the circuit parameters for the second circuit have a same number of angles, and the angles of the circuit parameters for the second circuit are initialized using optimized angles of the circuit parameters for the first circuit.

10. The method of claim 9 wherein running the second circuit on the second QPU also further optimizes the angles of the circuit parameters for the second circuit.

11. The method of claim 1 wherein:
    the circuit parameters for the first circuit comprise angles;
    the circuit parameters for the second circuit comprise angles;
    the second QPU has a larger number of levels than the first QPU; and
    the circuit parameters for the first circuit have fewer angles than the circuit parameters for the second circuit, and some of the angles of the circuit parameters for the second circuit are initialized using optimized angles of the circuit parameters for the first circuit.

12. The method of claim 11 wherein others of the angles of the circuit parameters for the second circuit are initialized based on the optimized angles of the circuit parameters for the first circuit.

13. The method of claim 1 wherein the variational quantum algorithm is a quantum neural network algorithm.

14. The method of claim 13 wherein the method implements a training phase for a quantum neural network.

15. The method of claim 1 wherein the variational quantum algorithm is a variational quantum eigensolver algorithm.

16. A method for solving a target problem by executing a variational quantum algorithm, the method comprising:
    for each of three or more stages wherein different stages use different types of hardware quantum processing units (QPUs):
        programming the QPU to implement a circuit that encodes a problem from a same family as the target problem, wherein the QPUs for different stages are characterized by different performance metrics selected from a group consisting of speed, size and fidelity; and
        repeatedly running the circuit on the QPU to advance execution of the variational quantum algorithm; and
    wherein execution of at least one of the later stages is based on results from at least one of the prior stages.

17. The method of claim 16 wherein the QPU for each stage executes at a faster speed than the QPU for the next stage.

18. The method of claim 16 wherein the circuit on the QPU for the last stage uses a same number of qubits or more qubits than the circuits for any of the prior stages.

19. The method of claim 16 wherein the QPU for the last stage has a same or higher fidelity than the QPUs for any of the prior stages.

20. A computer system for solving a target problem by executing a variational quantum algorithm, the computer system comprising:
    two different types of hardware quantum processing units (QPUs); and
    a classical processor, wherein the classical processor:
        determines a precursory problem from a same family as the target problem;
        programs a first of the QPUs to implement a first circuit that encodes the precursory problem;
        initializes circuit parameters for the first circuit;
        repeatedly runs the first circuit on the first QPU to iteratively optimize the circuit parameters for the first circuit;

programs a second of the QPUs to implement a second circuit that encodes the target problem, wherein the first and second QPUs are different types of QPU that are characterized by different performance metrics, and the first QPU is better than the second QPU in a first performance metric and worse than the second QPU in a second performance metric initializes circuit parameters for the second circuit based on the optimized circuit parameters for the first circuit; and repeatedly runs the second circuit on the second QPU to obtain a stochastic solution to the target problem.

\* \* \* \* \*